United States Patent
Ji et al.

(10) Patent No.: US 9,453,559 B2
(45) Date of Patent: *Sep. 27, 2016

(54) MULTI-STAGES AUTOMATIC TRANSMISSION FOR VEHICLE

(71) Applicant: Hyundai Motor Company, Seoul (KR)

(72) Inventors: Seong-Wook Ji, Ansan-si (KR); Jae-Chang Kook, Hwaseong-si (KR); Won-Min Cho, Hwaseong-si (KR); Myeong-Hoon Noh, Seongnam-si (KR); Kang-Soo Seo, Yongin-si (KR); Seong-Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/720,244

(22) Filed: May 22, 2015

(65) Prior Publication Data

US 2016/0108995 A1    Apr. 21, 2016

(30) Foreign Application Priority Data

Oct. 16, 2014 (KR) ........................ 10-2014-0139590

(51) Int. Cl.
*F16H 3/66*    (2006.01)

(52) U.S. Cl.
CPC ......... *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 7,614,975 B2 | 11/2009 | Seo | |
| 7,651,431 B2 | 1/2010 | Phillips et al. | |
| 8,591,376 B1 | 11/2013 | Shim | |
| 8,591,377 B1 | 11/2013 | Hoffman et al. | |
| 8,663,055 B2 | 3/2014 | Brehmer et al. | |
| 8,715,131 B2 | 5/2014 | Mellet et al. | |
| 8,821,336 B2 | 9/2014 | Wilton et al. | |
| 2005/0003924 A1 | 1/2005 | Tabata et al. | |
| 2008/0070740 A1 | 3/2008 | Gumpoltsberger | |
| 2008/0125269 A1 | 5/2008 | Gumpoltsberger | |
| 2008/0242492 A1* | 10/2008 | Phillips | F16H 3/66 475/276 |
| 2009/0264244 A1* | 10/2009 | Hart | F16H 3/66 475/275 |
| 2011/0045940 A1 | 2/2011 | Gumpoltsberger | |
| 2011/0045942 A1* | 2/2011 | Gumpoltsberger | F16H 3/66 475/275 |
| 2011/0245013 A1 | 10/2011 | Kim | |
| 2013/0316870 A1* | 11/2013 | Goleski | F16H 3/62 475/275 |

(Continued)

FOREIGN PATENT DOCUMENTS

DE    102009019046 A1    11/2010
JP    2012-112292    6/2012

(Continued)

OTHER PUBLICATIONS

Search Report dated Mar. 2, 2016 for European Patent Application No. 15168095.6.

(Continued)

*Primary Examiner* — Justin Holmes
(74) *Attorney, Agent, or Firm* — Morgan, Lewis & Bockius LLP

(57) ABSTRACT

A multi-stages automatic transmission for a vehicle includes a first, second, third and fourth planetary gear sets, each including a first, second and third rotation elements, respectively, and friction members including first, second, third and fourth clutches and first and second brakes.

5 Claims, 3 Drawing Sheets

(56) References Cited

U.S. PATENT DOCUMENTS

| | | | |
|---|---|---|---|
| 2014/0100073 A1 | 4/2014 | Lee | |
| 2014/0106923 A1 | 4/2014 | Borgerson et al. | |
| 2015/0099603 A1* | 4/2015 | Goleski | F16H 3/62 475/275 |
| 2016/0108995 A1 | 4/2016 | Ji | |

FOREIGN PATENT DOCUMENTS

| | | |
|---|---|---|
| JP | 2013-072464 A | 4/2013 |
| JP | 2013-190048 A | 9/2013 |
| JP | 2013-199959 A | 10/2013 |
| JP | 2013-204706 A | 10/2013 |
| JP | 2013-204709 A | 10/2013 |
| JP | 2013-204717 A | 10/2013 |
| JP | 2014-035056 A | 2/2014 |
| JP | 2014-035057 A | 2/2014 |
| JP | 5530340 B2 | 4/2014 |
| JP | 2014-105848 A | 6/2014 |
| JP | 2014-105849 A | 6/2014 |
| JP | 2014-105850 A | 6/2014 |
| KR | 10-2012-0119451 A | 10/2012 |
| KR | 10-2013-0000171 A | 1/2013 |
| KR | 2013-0031457 A | 3/2013 |
| KR | 2013-0077146 A | 7/2013 |
| KR | 10-2014-0046240 A | 4/2014 |
| KR | 10-1394033 B1 | 5/2014 |
| KR | 10-1416108 B1 | 7/2014 |
| KR | 2014-0101859 A | 8/2014 |
| WO | WO 2013/100620 A1 | 7/2013 |

OTHER PUBLICATIONS

Christoph Dorr et al., The nine-speed automatic transmission 9G-Tronic of Mercedes Benz, ATZ-*Automobiltechnische Zeitxchrift*, Jan. 31, 2014, Jan. 2014, pp. 40-45, Germany.

\* cited by examiner

FIG.2

|   | C1 | C2 | C3 | C4 | B1 | B2 |
|---|----|----|----|----|----|----|
| 1 | ● | ● |   |   |   | ● |
| 2 |   | ● |   |   | ● | ● |
| 3 | ● |   |   |   | ● | ● |
| 4 |   |   |   | ● | ● | ● |
| 5 | ● |   |   | ● | ● |   |
| 6 |   | ● |   | ● | ● |   |
| 7 |   | ● | ● | ● |   |   |
| 8 |   |   | ● | ● | ● |   |
| 9 |   | ● | ● |   | ● |   |
| 10 | ● |   | ● |   | ● |   |
| R | ● |   | ● |   |   | ● |

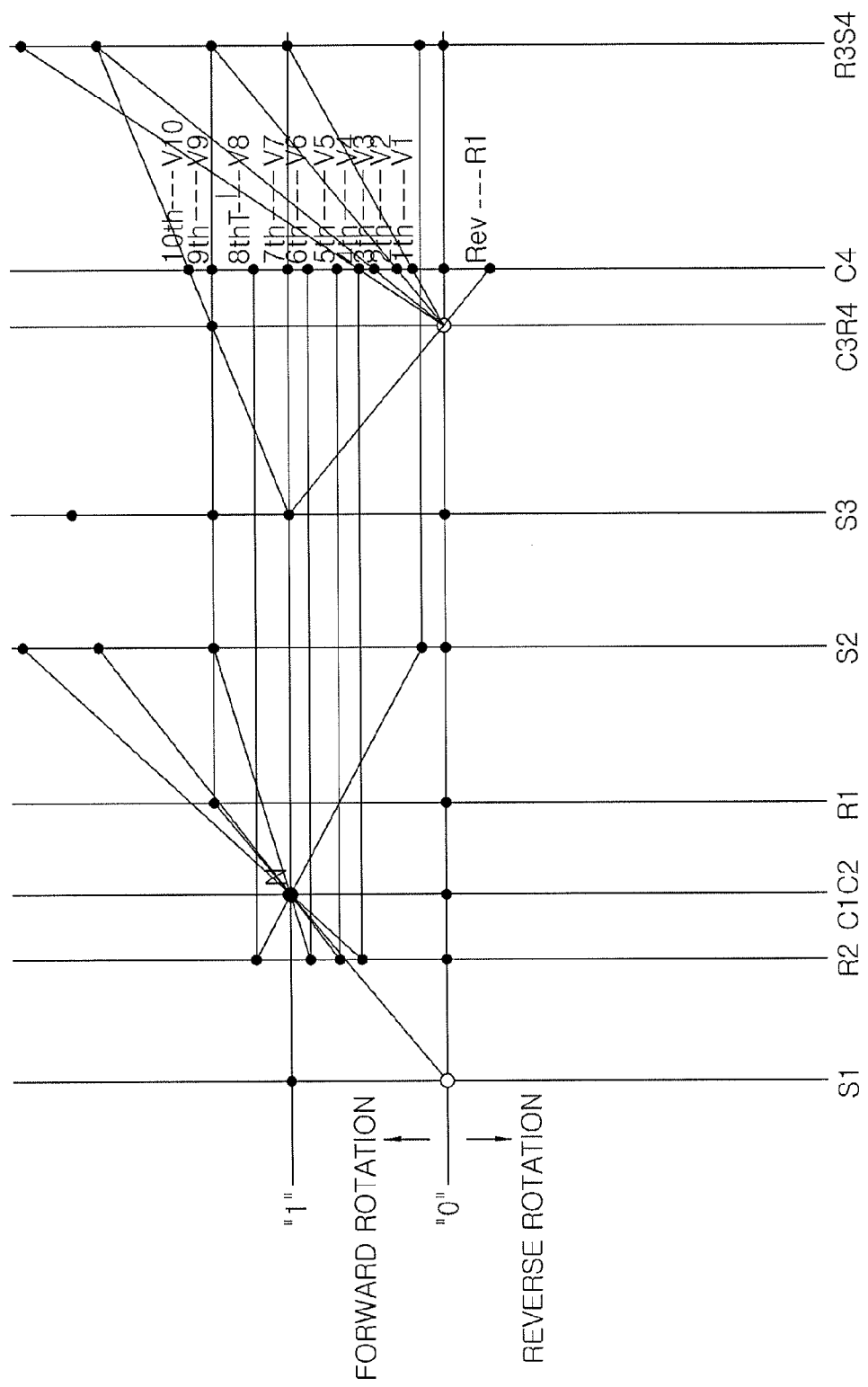

MULTI-STAGES AUTOMATIC TRANSMISSION FOR VEHICLE

CROSS-REFERENCE TO RELATED APPLICATION

The present application claims priority to Korean Patent Application No. 10-2014-0139590, filed Oct. 16, 2014, the entire contents of which is incorporated herein for all purposes by this reference.

BACKGROUND OF THE INVENTION

1. Field of the Invention

The present invention relates to a multi-stages automatic transmission for a vehicle, and more particularly, to a multi-stages automatic transmission for a vehicle equipped with a gear train embodying 10 forward speeds and 1 reverse speed with gear efficiency 98.6%.

2. Description of Related Art

Recently, the technology development need for performance improvement has emerged similarly in the power train field by requirement of a higher need for fuel efficiency improvements due to strengthening of environmental regulations or rising oil prices.

Appropriate power train technologies corresponding to the need have been provided, including an engine downsizing technology and a multi-staging technology of an automatic transmission. The engine downsizing has merits of reducing weight and improving fuel efficiency, and particularly, the automatic transmission multi-staging has merits of securing drivability and competitiveness of fuel efficiency at the same time through design of an excellent gear ratio in terms of power performance and fuel efficiency by using more shift stages as compared to a 4-speed (or 5-speed), and 1 reverse speed automatic transmission.

An instance of such multi-staging of the automatic transmission, includes an 8 forward speed and 1 reverse speed automatic transmission by combining three planetary gear sets and six friction elements, and 9 forward speed and 1 reverse speed automatic transmission by combining four planetary gear sets, four friction elements and two dog clutches.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

In the related art, a problem arises in that in an automatic transmission, when the number of shift stages is increased, the number of internal components that make up the automatic transmission is increased when implementing the shift stages with a gear train through a planetary gear set. Thus, in the multi-staging of the automatic transmission, above all it is important to achieve drivability and fuel efficiency competitiveness with the gear train structure without increasing the number of internal components, thus worsening vehicle mount ability, decreasing power transmission efficiency, and increasing weight and manufacturing cost.

Therefore, an optimal structure of the gear train which may lead to maximum efficiency with fewer components should be applied to the development of the 10 forward speed and 1 reverse speed automatic transmission to enhance the fuel efficiency effect with the increased shift stages compared to eight forward stages and one reverse stage of the automatic transmission or nine forward speed and 1 reverse speed automatic transmission.

Various aspects of the present invention are directed to providing a multi-stages automatic transmission for a vehicle that improves drivability of the vehicle using an operation point of a low RPM range of an engine by implementing 10 forward speeds and 1 reverse speed with the gear train using four planetary gear sets, four clutches and two brakes, and especially, achieves better fuel efficiency improvement with the gear train implementing gear efficiency of 98.6%.

According to various aspects of the present invention, a multi-stages automatic transmission for a vehicle may include first, second, third and fourth planetary gear sets each including first, second and third rotation elements, respectively, and friction members including first, second, third and fourth clutches and first and second brakes, in which an input shaft may be fixedly connected to the second rotation element of the first planetary gear set and the second rotation element of the second planetary gear set, the third rotation element of the first planetary gear set may be fixedly connected to the second rotation element of the third planetary gear set, the first rotation element of the second planetary gear set may be fixedly connected to the first rotation element of the fourth planetary gear set, the first rotation element of the third planetary gear set may be fixedly connected to the first rotation element of the fourth planetary gear set, and an output shaft may be fixedly connected to the second rotation element of the fourth planetary gear set.

The first break may fix the first rotation element of the first planetary gear set, the second break may fix the third rotation element of the fourth planetary gear set, the first clutch may connect the second rotation element of the second planetary gear set with the third rotation element of the third planetary gear set, the second clutch may connect the first rotation element of the third planetary gear set with the third rotation element of the third planetary gear set, the third clutch may connect the third rotation element of the first planetary gear set with the third rotation element of the fourth planetary gear set, and the fourth clutch may connect the third rotation element of the second planetary gear set with the output shaft.

The first planetary gear set and the second planetary gear set may comprise a first complex planetary gear set, and the third planetary gear set and the fourth planetary gear set comprise a second complex planetary gear set.

The first planetary gear set may include a first sun gear as the first rotation element, a first carrier as the second rotation element, and a first ring gear as the third rotation element, the second planetary gear set may include a second sun gear as the first rotation element, a second carrier as the second rotation element, and a second ring gear as the third rotation element, the third planetary gear set may include a third sun gear as the first rotation element, a third carrier as the second rotation element, and a third ring gear as the third rotation element, and the fourth planetary gear set may include a fourth sun gear as the first rotation element, a fourth carrier as the second rotation element, and a fourth ring gear as the third rotation element.

The first sun gear among the first sun gear, the first carrier and the first ring gear of the first planetary gear set may be fixed with the first brake, the first carrier may be continuously fixed with the input shaft to connect with the second carrier, and the first ring gear may be fixedly connected to the third carrier and selectively connected to the second brake through the third clutch.

The second sun gear among the second sun gear, the second carrier and the second ring gear of the second planetary gear set may be continuously fixed with the fourth sun gear, the second carrier may be continuously fixed to the input shaft and selectively connected with the third ring gear through the first clutch, and the second ring gear may be selectively connected with the output shaft through the fourth clutch.

The third sun gear among the third sun gear, the third carrier, and the third ring gear of the third planetary gear set may be continuously fixed with the fourth sun gear, the third carrier may be selectively connected with the fourth ring gear through the third clutch, and the third ring gear may be selectively connected with the third carrier through the second clutch.

The fourth sun gear among the fourth sun gear, the fourth carrier, and the fourth ring gear of the fourth planetary gear set may be continuously fixed with the third sun gear, the fourth carrier may be fixedly connected with the output shaft, and the fourth ring gear may be fixed with the second brake and selectively connected with the first ring gear through the third clutch.

As such, the multi-stages automatic transmission of the present invention implements 10 forward speeds and 1 reverse speed with the gear train using the four planetary gear sets, the four clutches, and the two brakes, thereby realizing an effect that the elements for a transmission implementing 10 forward speeds and 1 reverse speed are minimized.

Also, the multi-stages automatic transmission of the present invention has an effect that simultaneously achieves the fuel efficiency improvement according to forward 10-speeds by the structure of the optimized gear train with gear efficiency of 98.6% and improves drivability of the vehicle by using an operation point of a low RPM range of the engine.

In addition, the present invention has an effect of responding quickly to a market for the multi-stages automatic transmissions having an increased mounting ratio of more than 7-speed automatic transmission.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational view at each shift stage of friction members applied to a gear train of the exemplary multi-stages automatic transmission according to the present invention.

FIG. 3 is a lever diagram of a gear train according to the present invention.

Figure 1:
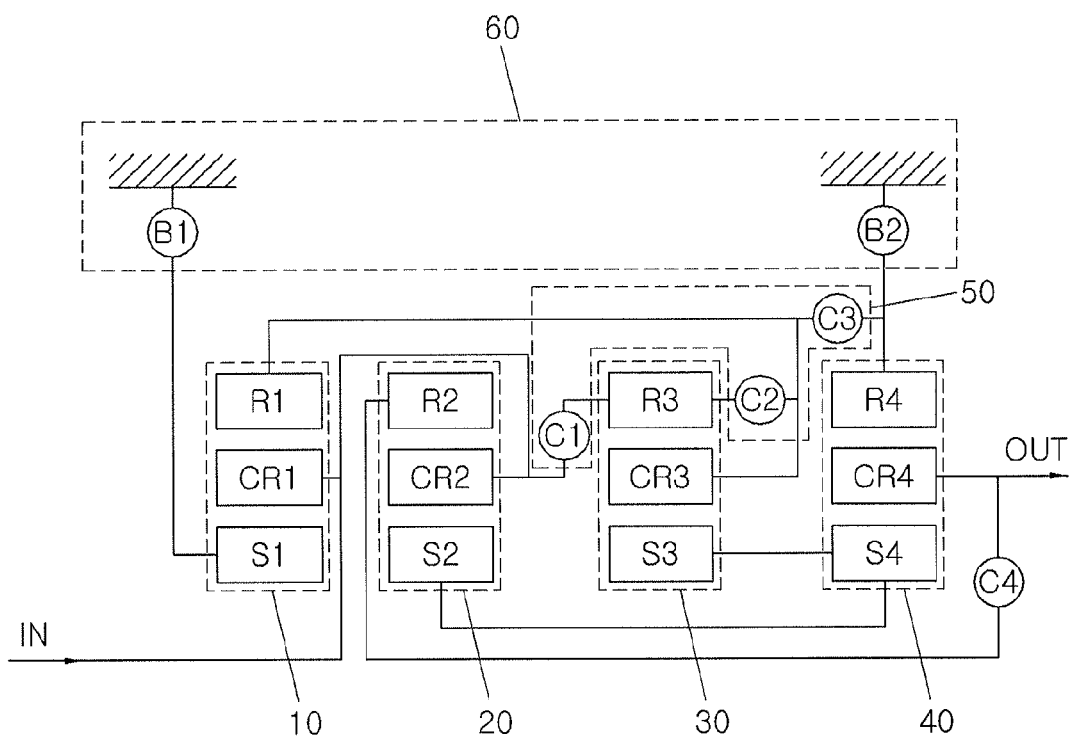
FIG. 1 is a gear train configuration of an exemplary multi-stages automatic transmission for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 shows a configuration of a gear train of a multi-stages automatic transmission for a vehicle according to the present invention. As shown, an input at a gear train is achieved through an input shaft IN as an input member and an output gets out to an output shaft OUT as an output member. The input shaft IN means a turbine shaft of a torque convert into which the rotational power from an engine crank shaft is torque-converted and then inputted. The output shaft OUT is connected to a well-known differential device rotating driving wheels.

To achieve this, the gear train may include four planetary gear sets 10, 20, 30 and 40 disposed in the same shaft line, a clutch set 50 including a first, second, third and fourth clutches C1, C2, C3, C4, a brake set 60 including first and second brakes B1, B2, thereby embodying a forward 10-speed and a reverse 1-speed through the selective operations of four planetary gear sets and six friction members. Particularly, the four planetary gear sets 10, 20, 30, 40 may be classified into a first complex planetary gear device including the first planetary gear set 10 and the second planetary gear set 20 and a second complex planetary device including the third planetary gear set 30 and the fourth planetary gear set 40. The first complex planetary gear device and the second complex planetary gear device may be connected each other through at least one continuous combination route and through at least two selective combination route.

In the concrete, a first rotation element of the first planetary gear set 10 may be fixed with a first brake B1, a second rotation element of the first planetary gear set 10 may be continuously fixed with the input shaft IN to fixedly connect to a second rotation element of the second planetary gear set 20, a third rotation element of the first planetary gear set 10 may be fixedly connected to a second rotation element of the third planetary gear set 30 and may be selectively connected to the second brake B2 through the third clutch C3. A first rotation element of the second planetary gear set 20 may be continuously fixed with a first rotation element of the fourth planetary gear set 40, a second rotation element of the second planetary gear set 20 may be continuously fixed to the input shaft IN to selectively connect to a third rotation element of the third planetary gear set 30 through the first clutch C1, and a third rotation element of the second planetary gear set 20 may be selectively connected to the output shaft OUT through the fourth clutch C4. A first rotation element of the third planetary gear set 30 may be continuously fixed with a first rotation element of the fourth planetary gear set 40, a second rotation element of the third planetary gear set 30 may be selectively connected to a third rotation element of the fourth planetary gear set 40 through the third clutch C3, and a third rotation element of the third planetary gear set 30 may be selectively connected to a third rotation element of the fourth planetary gear set 40 through the second and third clutches C2, C3. A first rotation element of the fourth planetary gear set 40 may be continuously fixed with a first rotation element of the third planetary gear set 30, a second rotation element of the fourth planetary gear set 40 may be fixedly connected to the output shaft OUT, and a third rotation element of the fourth planetary gear set 40 may be fixed with the second brake B2 and selectively connected to a third rotation element of the first planetary gear set 10 through the third clutch C3.

Therefore, the first, second, third and fourth planetary gear sets 10, 20, 30, 40 include the first, second and third rotation elements, respectively. For example, the first, second and third rotation elements of the first planetary gear set 10 are a first sun gear S1 as the first rotation element, a first carrier CR1 as the second rotation element and a first ring gear R1 as the third rotation element, respectively. The first, second and third rotation elements of the second planetary gear set 20 are a second sun gear S2 as the first rotation element, a second carrier CR2 as the second rotation element and a second ring gear R2 as the third rotation element, respectively. The first, second and third rotation elements of the third planetary gear set 30 are a third sun gear S3 as the first rotation element, a third carrier CR3 as the second rotation element and a third ring gear R3 as the third rotation element, respectively. The first, second and third rotation elements of the fourth planetary gear set 40 are a fourth sun gear S4 as the first rotation element, a fourth carrier CR4 as the second rotation element and a fourth ring gear R4 as the third rotation element respectively.

Specifically, the first sun gear S1 may be fixed with the first brake B1. The first carrier CR1 may be continuously fixed with the input shaft IN to fixedly connect to the second carrier CR2. The first ring gear R1 may be fixedly connected to the third carrier CR3 and may be selectively fixed with the second brake B2 through the third clutch C3. Thus, the continuous combination route between the first complex planetary gear set including the first and second planetary gear sets 10, 20 and the second complex planetary gear set including the third and fourth planetary gear sets 30, 40 may be formed to the first ring gear R1 and the third carrier CR3.

Concretely, the second sun gear S2 may be continuously connected to the fourth sun gear S4. The second carrier CR2 may be continuously fixed with the input shaft IN and selectively connected to the third ring gear R3 through the first clutch C1. The second ring gear R2 may be selectively connected to the output shaft OUT through the fourth clutch C4. Thus, the second ring gear R2 along with the fourth carrier CR4 acts selectively as a gear train output element.

Specifically, the third sun gear S3 may be continuously fixed with the fourth sun gear S4. The third carrier CR3 may be selectively connected with the fourth ring gear R4 through the third clutch C3. The third ring gear R3 may be selectively connected with the third carrier CR3 through the second clutch C2.

Concretely, the fourth sun gear S4 may be continuously connected to the third sun gear S3. The fourth carrier CR4 may be fixedly connected with the output shaft OUT. The fourth ring gear R4 may be fixed with the second brake B2 and selectively connected to the first ring gear R1 through the third clutch C3. Thus, the fourth carrier CR4 acts as a gear train output element.

Moreover, the first, second, third and fourth clutches C1, C2, C3, C4 and the first and second brakes B1, B2 consisting of six friction members may be made up of a hydraulic multi-plates friction combination unit friction-coupled by hydraulic pressure, ordinary ways.

Specifically, the first brake B1 is disposed in front of the first planetary gear set 10, the second brake B2 is disposed in the rear of the fourth planetary gear set 40, the first clutch C1 is disposed between the rear of the second planetary gear set 20 and the front of the third planetary gear set 30, the second and third clutches C2, C3 are disposed between the rear of the third planetary gear set 30 and the front of the fourth planetary gear set 40, and the fourth clutch C4 is disposed in the rear of the fourth planetary gear set 40. By applying such arrangement, the hydraulic pressure passage supplied to the friction members may be easily formed and the distribution of weight is uniform, thereby improving the total weight balance of the automatic transmission.

Concretely, the first brake B1 may fix the first sun gear S1 and the second brake B2 may fix the fourth ring gear R4. The first clutch C1 may selectively connect the second carrier CR2 and the third ring gear R3, the second clutch C2 may selectively connect the third carrier CR3 and the third ring gear R3, the third clutch C3 may selectively connect the first ring rear R1 and the fourth ring gear R4, and the fourth clutch C4 may selectively connect the second ring gear R2 and the output shaft OUT.

As such, since each shift stage may be embodied by coupling all three operation elements, the number of inoperative friction elements is reduced, thereby decreasing friction drag loss.

Figure 2:
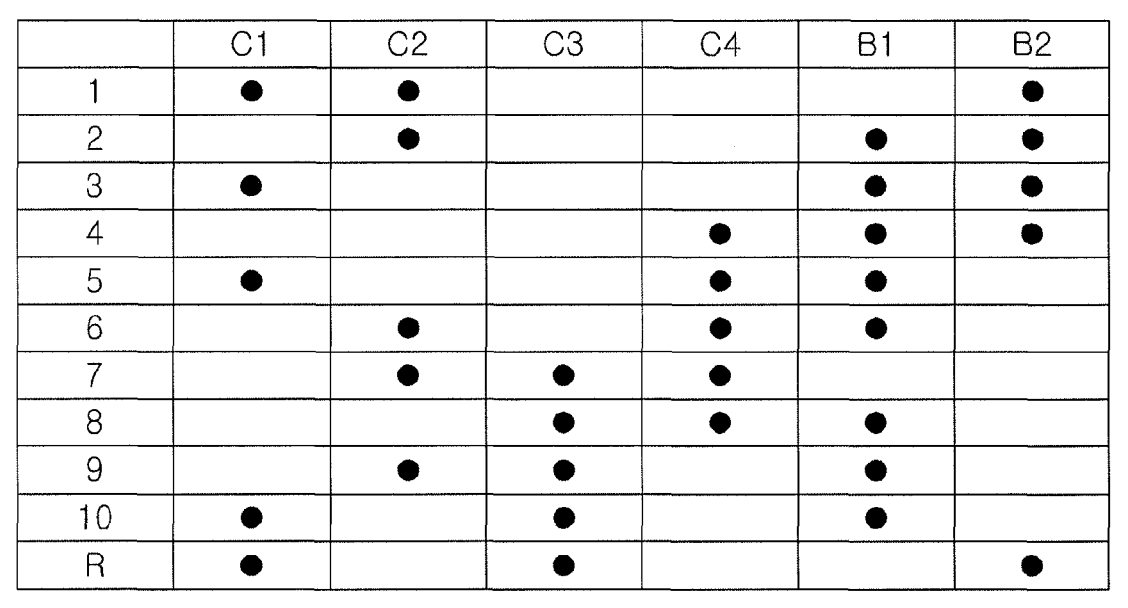

On the other hand, FIG. 2 is operational elements at each shift stage of the friction members applied to a gear train in accordance with an exemplary embodiment of the present invention. FIG. 3 is a visible knowable lever diagram showing speed ratio relation embodying the shift stage of the 1st forward speed to the forward 10-speed and the shift stage of the 1st reverse speed in which the first clutch C1 to the fourth clutch C4, the first brake B1 and the second brake B2 at the gear train according to the present invention are operated in accordance with the operation table of FIG. 2. At the lever analysis diagram, a horizontal line where the first brake B1 and the second brake B2 are positioned represents a rotational speed "0" and an upper horizontal line thereof represents a rotational speed "1.0" having the same rotational speed of the input shaft IN. Furthermore, a vertical line may be set with operation elements of the first, second, third and fourth planetary gear sets 10, 20, 30, 40 from the left sequentially, the intervals thereof are determined according to each gear ratio (the number of teeth of the sun gear/the number of teeth of the ring gear) of the operation elements which are directly connected with each other among the operation elements, and the position setting of each operation element has been well known to those skilled in the power train and thus omitted.

At the 1st forward speed, the first clutch C1, the second clutch C2 and the second brake B2 are operated so that the 1st forward speed is embodied. Then, the operating of the first clutch C1 connects the input shaft IN at the second carrier CR2 to the third ring gear R3, the operating of the second clutch C2 connects the third carrier CR3 with the third ring gear R3 and the operating of the second brake B2 allows the fourth ring gear R4 to fix. Due to this, the input of the input shaft IN is transmitted to the first carrier CR1 of the first planetary set 10 and the second carrier CR2 of the second planetary gear set 20, the output of the 1st forward speed is made at the fourth carrier CR4 of the fourth planetary gear set 40 as much as V1 of the horizontal line by forming a speed line of a lever line diagram by complementary operating rotation elements. The 1-speed output of the fourth carrier CR4 is transmitted to the differential device through the output shaft OUT, thereby the shifting of the 1st forward speed is completed.

At the 2nd forward speed, the second clutch C2, the first and second brakes B1 and B2 are operated in order to form the shifting by releasing of the first clutch C1 and operating of the first brake B1 in the state of the 1st forward speed. Then, the releasing of the first clutch C1 disconnects the third ring gear R3 from the input shaft IN, the operating of the second clutch C2 connects the third carrier CR3 to the third ring gear R3, and the operating of the first brake B1 fixes the first sun gear S1. Due to this, the output of the 2nd forward speed is made at the fourth carrier CR4 of the fourth planetary gear set 40 as much as V2 of the horizontal line by forming a speed line of the lever line diagram by complementary operating rotation elements. The 2-speed output of the fourth carrier CR4 is transmitted to the differential device through the output shaft OUT, thereby the shifting of the 2nd forward speed is completed.

At the 3rd forward speed, the first clutch C1 and the first and second brakes B1 and B2 are operated to form the shifting by releasing of the second clutch C2 and operating of the first clutch C1 in the state of the 2nd forward speed. Then, the releasing of the second clutch C2 disconnects the third carrier CR3, the operating of the first clutch C1 connects the input shaft IN at the second carrier CR2 with the third ring gear R3. Due to this, the output of the forward 3-speed is made at the fourth carrier CR4 of the fourth planetary gear set 40 as much as V3 of the horizontal line by forming a speed line of the lever line diagram by complementary operating rotation elements. The 3-speed output of the fourth carrier CR4 is transmitted to the differential device through the output shaft OUT, thereby the shifting of the 3rd forward speed is completed.

At the 4th forward speed, the fourth clutch C4 and the first and second brake B1, B2 are operated to form the shifting by releasing of the first clutch C1 and operating of the fourth clutch C4 in the state of the 3rd forward speed. Then, the releasing of the first clutch C1 disconnects the input shaft IN and the third ring gear R3, the operating of the fourth clutch C4 connects the second ring gear R2 with the output shaft OUT. Due to this, the output of the 4th forward speed is made at the fourth carrier CR4 of the fourth planetary gear set 40 as much as V4 of the horizontal line by forming a speed line of the lever line diagram by complementary operating rotation elements. The 4-speed output of the fourth carrier CR4 is transmitted to the differential device through the output shaft OUT, thereby the shifting of the 4th forward speed is completed.

At the 5th forward speed, the first and fourth clutches C1 and C4 and the first brake B1 are operated to form the shifting by releasing of the second brake B2 and operating of the first clutch C1 in the state of the 4th forward speed. Then, the operating of the first clutch C1 connects the input shaft IN at the second carrier CR2 to the third ring gear R3, the releasing of the second brake B2 releases the fourth ring gear R4. Due to this, the output of the 5th forward speed is made at the fourth carrier CR4 of the fourth planetary gear set 40 as much as V5 of the horizontal line by forming a speed line of the lever line diagram by complementary operating rotation elements. The 5-speed output of the fourth carrier CR4 is transmitted to the differential device through the output shaft OUT, thereby the shifting of the 5th forward speed is completed.

At the 6th forward speed, the second and fourth clutches C2 and C4 and the first brake B1 are operated to form the shifting by releasing of the first clutch C1 and operating of the second clutch C2 in the state of the 5th forward speed. Then, the releasing of the first clutch C1 disconnects the third ring gear R3 and the input shaft IN, the operating of the second clutch C2 connects the third carrier CR3 with the third ring gear R3. Due to this, the output of the 6th forward speed is made at the fourth carrier CR4 of the fourth planetary gear set 40 as much as V6 of the horizontal line by forming a speed line of the lever line diagram by complementary operating rotation elements. The 6-speed output of the fourth carrier CR4 is transmitted to the differential device through the output shaft OUT, thereby the shifting of the 6th forward speed is completed.

At the 7th forward speed, the second, third and fourth clutches C2, C3 and C4 are operated to form the shifting by releasing of the first brake B1 and operating of the third clutch C3 in the state of the 6th forward speed. Then, the releasing of the brake B1 releases the first sun gear S1, the operating of the third clutch C3 connects the first ring gear R1 with the fourth ring gear R4. Due to this, the output of the 7th forward speed is made at the fourth carrier CR4 of the fourth planetary gear set 40 as much as V7 of the horizontal line by forming a speed line of the lever line diagram by complementary operating rotation elements. The 7-speed output of the fourth carrier CR4 is transmitted to the differential device through the output shaft OUT, thereby the shifting of the 7th forward speed is completed.

At the 8th forward speed, the third and fourth clutches C3 and C4 and the first brake B1 are operated to form the shifting by releasing of the second clutch C2 and operating of the first brake B1 in the state of the 7th forward speed. Then, the releasing of the second clutch C2 disconnects the third carrier CR3, the operating of the first brake B1 fixes the first sun gear S1. Due to this, the output of the 8th forward speed is made at the fourth carrier CR4 of the fourth planetary gear set 40 as much as V8 of the horizontal line by forming a speed line of the lever line diagram by complementary operating rotation elements. The 8-speed output of the fourth carrier CR4 is transmitted to the differential device through the output shaft OUT, thereby the shifting of the 8th forward speed is completed.

At the 9th forward speed, the second and third clutches C2 and C3 and the first brake B1 are operated to form the shifting by releasing of the fourth clutch C4 and operating of the second clutch C2 in the state of the 8th forward speed. Then, the releasing of the fourth clutch C4 disconnects the output shaft OUT with the second ring gear R2, the operating of the second clutch C2 connects the third carrier CR3 with the third ring gear R3. Due to this, the output of the forward 9-speed is made at the fourth carrier CR4 of the fourth planetary gear set 40 as much as V9 of the horizontal line by forming a speed line of the lever line diagram by complementary operating rotation elements. The 9-speed output of the fourth carrier CR4 is transmitted to the differential device through the output shaft OUT, thereby the shifting of the 9th forward speed is completed.

At the 10th forward speed, the first and third clutches C1 and C3 and the first brake B1 are operated to form the shifting by releasing of the second clutch C2 and operating of the first clutch C1 in the state of the 9th forward speed. Then, the releasing of the second clutch C2 disconnects the third carrier CR3, the operating of the first clutch C1 connects the input shaft IN at the second carrier CR2 with the third ring gear R3. Due to this, the output of the 10th forward speed is made at the fourth carrier CR4 of the fourth planetary gear set 40 as much as V10 of the horizontal line by forming a speed line of the lever line diagram by complementary operating rotation elements. The 10-speed output of the fourth carrier CR4 is transmitted to the differential device through the output shaft OUT, thereby the shifting of the 10th forward speed is completed.

At the 1 reverse speed, the first and third clutches C1 and C3 and the second brake B2 are operated to form the shifting. Then, the operating of the first clutch C1 connects the input shaft IN at the second carrier CR2 with the third ring gear R3, the operating of the third clutch C3 connects the first ring gear R1 with the fourth ring gear R4, and the operating of the second brake B2 allows the fourth ring gear R4 to fix. Due to this, the input of the input shaft IN is transmitted to the first carrier CR1 of the first planetary gear set 10 and the fourth ring gear R4 of the fourth planetary gear set 40, and the output of the 1 reverse speed is made at the fourth carrier CR4 of the fourth planetary gear set 40 as much as R1 of the horizontal line by forming a speed line of the lever line diagram by complementary operating rotation elements, the reverse 1-speed output of the fourth carrier CR4 is transmitted to the differential device through the output shaft OUT, thereby the shifting of the 1st reverse speed is completed.

As described above, the multi-stages automatic transmission for the vehicle according to various embodiments of the present invention includes a gear train including four planetary gear sets 10, 20, 30 and 40, six friction members made of the first, second, third and fourth clutches C1, C2, C3 and C4 and the first and second brakes B1 and B2, thereby the forward 10-speed and reverse 1-speed with a various array of the first, second, third and fourth clutches C1, C2, C3 and C4 on rotation elements may be embodied variously.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multi-stages automatic transmission for a vehicle comprising:
   first, second, third and fourth planetary gear sets, each including first, second and third rotation elements, respectively; and
   friction members including first, second, third and fourth clutches and first and second brakes,
   wherein an input shaft is fixedly connected to the second rotation element of the first planetary gear set and the second rotation element of the second planetary gear set, the third rotation element of the first planetary gear set is fixedly connected to the second rotation element of the third planetary gear set, the first rotation element of the second planetary gear set is fixedly connected to the first rotation element of the fourth planetary gear set, the first rotation element of the third planetary gear set is fixedly connected to the first rotation element of the fourth planetary gear set, and an output shaft is fixedly connected to the second rotation element of the fourth planetary gear set.

2. The multi-stages automatic transmission for the vehicle of claim 1, wherein the first brake selectively fixes the first rotation element of the first planetary gear set, the second brake selectively fixes the third rotation element of the fourth planetary gear set, the first clutch selectively connects the second rotation element of the second planetary gear set with the third rotation element of the third planetary gear set, the second clutch selectively connects the second rotation element of the third planetary gear set with the third rotation element of the third planetary gear set, the third clutch selectively connects the third rotation element of the first planetary gear set with the third rotation element of the fourth planetary gear set, and the fourth clutch selectively connects the third rotation element of the second planetary gear set with the output shaft.

3. The multi-stages automatic transmission for the vehicle of claim 1, wherein the first planetary gear set, the second planetary gear set, the third planetary gear set and the fourth planetary gear set comprise a single planetary gear set.

4. The multi-stages automatic transmission for the vehicle of claim 1, wherein the first planetary gear set comprises a first sun gear as the first rotation element, a first carrier as the second rotation element, and a first ring gear as the third rotation element,
   the second planetary gear set comprises a second sun gear as the first rotation element, a second carrier as the second rotation element, and a second ring gear as the third rotation element,
   the third planetary gear set comprises a third sun gear as the first rotation element, a third carrier as the second rotation element, and a third ring gear as the third rotation element, and
   the fourth planetary gear set comprises a fourth sun gear as the first rotation element, a fourth carrier as the second rotation element, and a fourth ring gear as the third rotation element.

5. The multi-stages automatic transmission for the vehicle of claim 4, wherein the first planetary gear set, the second planetary gear set, the third planetary gear set, and the fourth planetary gear set are disposed on a same shaft line,
   wherein the first planetary gear set is fixed with the first brake, the secondary planetary gear set is continuously fixed with the fourth planetary gear set, the third planetary gear set is continuously fixed with the fourth planetary gear set and the first planetary gear set is continuously fixed with the third planetary gear set.

* * * * *